December 27, 1938

2,141,189

UNITED STATES PATENT OFFICE 2,141,189

BLEACHING AND CLEANSING COMPOSITIONS

Otto Lind, Dusseldorf, Germany, assignor to Henkel & Cie. G. m. b. H., Dusseldorf-Holthausen, Germany, a corporation of Germany No Drawing. Application December 17, 1934, Serial No. 757,891. In Germany December 21, 1933

9 Claims. (Cl. 8—2)

This invention relates to compositions of matter containing mixtures of pyrophosphates or other similar phosphates with per salts or peroxides, such compositions being adapted for bleaching, cleansing and other purposes, particularly for the treatment of textiles in industrial processes and in the household.

Compositions composed of pyrophosphates and percompounds such as hydrogen peroxide and perborates are known in the prior art, but when aqueous alkaline solutions of the same are produced the per compounds rapidly decompose and lose their effectiveness (see Zeitschrift fuer angewandte Chemie, 1914, page 291 et seq.).

An object of the present invention is to provide compositions of this type in which the per compounds are so stabilized that very effective washing, cleansing and bleaching agents may be produced and made available for industrial and other uses.

In accordance with the present invention, I have discovered that the difficultly soluble or substantially insoluble silicates have the property of stabilizing alkaline solutions of the phosphate-per compound mixtures or of regulating the rate of oxygen delivery from such mixtures.

In its broader aspects the invention comprehends compositions composed, wholly or in part, of a per compound capable of liberating oxygen when in aqueous solution, a water soluble salt of any of the phosphoric acids having a lower proportion of chemically combined water molecules than orthophosphoric acid, a difficultly soluble silicate and if desired any desired substance capable of rendering aqueous solutions of the composition more alkaline. To produce compositions of particular properties for special purposes, any one or more of a number of substances may be added as will hereinafter be described.

In producing the compositions constituting the present invention there may be employed any one or more of those per-compounds which liberate oxygen when dissolved in water or which have heretofore been practically or theoretically utilizable as bleaching agents. Among the compounds usable are the alkaline salts, especially the sodium salts, of per acids such as perborates, percarbonates, perphosphates, persulfates, perpyrophosphates and similar salts, and hydrogen peroxide as well as its organic derivatives such as the addition products of hydrogen peroxide and urea.

The phosphate salts constituting another component of the compositions of the present invention may be referred to collectively as the water soluble salts of those phosphoric acids having fewer molecules of water, or a smaller proportion of water molecules, than orthophosphoric acid, which terminology includes the pyrophosphates, the metaphosphates and the polyphosphates. These salts may be used in their monomeric as well as in their polymeric form, for example, as trimeric or hexameric metaphosphate. Additional examples comprise calcined neutral sodium pyrophosphate or that containing water of crystallization, trimeric or hexameric sodium metaphosphates and sodium polyphosphates having for example the formulas $Na_5P_3O_{10}$ or $Na_6P_4O_{13}$ or $Na_9P_5O_{17}$ or $Na_{12}P_{10}O_{31}$. For certain purposes subphosphates may also be used having, for example, the formula $Na_4P_2O_6$. The proportion of the phosphate salts to the per compounds in the compositions may be varied within wide limits and is fairly unimportant as far as the broad concepts of the invention are concerned, for the difficultly soluble silicates added have their stabilization effect upon all practical mixtures of these substances.

The stabilizing agents which I have found so highly effective in preventing the dissociation of the above-mentioned per compounds are colourless and may be referred to broadly as the difficultly soluble or substantially water insoluble silicates. As examples of suitable compounds, there may be mentioned silicates of calcium, strontium, barium, zinc, cadmium, magnesium and tin, which metals happen to be principally in Groups II and IV of the periodic system of elements and have an atomic weight of from 20 to 140. Of the compounds mentioned the magnesium silicate generally gives the best results, followed closely by the silicates of cadmium, zinc, barium and tin. The proportion of silicates necessary to accomplish the desired degree of stabilization or regulation is dependent upon the particular metal salt employed and upon the nature and proportion of the other ingredients used, and therefore may vary within wide limits. Frequently, a very satisfactory stabilization may be obtained by the use of 0.5 to 5% (calculated on the amount of metal oxide), though larger amounts are sometimes essential.

Where the mixtures herein described are to be used as washing and cleansing agents, one or more alkaline substances are employed which substances may in general be referred to as those compounds which give an alkaline reaction in solution. Thus there may be added to the compositions any one or more of the alkaline salts, such as water glass, or alkaline metasilicates, or alkaline carbonates, or alkaline borates, borax, or alkaline orthophosphates.

To impart additional detergent properties to the composition there may be added soap, saponines or other soap substitutes or soap-like compounds, for example, the alkali metal salts of sulfonated or sulfated oils or fatty alcohols, or other capillarily-active compounds containing in their molecule lyophilic radicals of large molecular weight on the one hand, and groups adapted to impart water solubility on the other hand which substances are referred to collectively as saponaceous compounds.

Furthermore, I have discovered that the difficultly soluble, colourless silicates have a stabilizing effect upon compositions of the hereinbefore described nature which contain other substances of a most varied nature comprising, for example, other konwn washing, cleansing, softening, rinsing, foaming, wetting, emulsifying, penetrating, dissolving, superfatting, disinfecting and scrubbing agents, and the like.

The present invention is independent of the method by which the various ingredients are compounded. They may be mixed or ground in any suitable device and may be added to each other in any desired order. For example, the per compounds may be mixed first with the difficultly soluble silicates and then with the desired amount of phosphates, or with mixtures thereof with the alkaline substances.

The compositions may be prepared in solid, liquid or in paste form. Thus they may be sold in commerce and/or put in use in the form of powders, granules, flakes, thin strips, or pastes, or in the form of solutions or emulsions in water or other inorganic or organic solvent. Obviously the mixing either wholly or in part may be effected at the place where the composition is to be used, if such is found more convenient or desirable.

The washing and cleansing compositions containing the mixtures of compounds herein described may be employed in many different branches of industry and as well as in the household. For example, they may be utilized for general washing and cleansing, for the bleaching and rinsing of textiles including linen, for laundering purposes and for the treatment of various fibrous materials.

Example 1

Ten parts by weight of sodium perborate are intimately mixed with 14 parts by weight of neutral sodium pyrophosphate, after which 1 part by weight of magnesium silicate and 8 parts by weight of soda are added. The composition produced constitutes a bleaching agent which is excellently suitable for the bleaching of fabrics in the textile industry. Aqueous solutions of this composition are particularly valuable because of their slow and uniform liberation of oxygen.

Example 2

Twenty-one parts of sodium perborate, 37 parts of sodium pyrophosphate, 2 parts of barium silicate and 40 parts of soda, all by weight, are mixed together in any suitable mixing device. The composition produced is excellently suited for bleaching and rinsing fabrics in the textile industry, such composition also possessing a good cleansing power. The bleaching action of aqueous solutions of this composition lasts for an unexpectedly long period of time.

Example 3

Ten parts of sodium perborate, 15 parts of neutral sodium pyrophosphate, 2 parts of cadmium silicate, 11 parts of soda and 62 parts of soap, all by weight, are intimately mixed in a grinding mill. By this procedure an excellent washing agent is obtained which may be used to advantage in the household and in industry for washing soiled clothes, textiles and the like.

Example 4

Ten parts of sodium perborate, 18 parts of a polyphosphate having the formula $Na_9P_5O_{17}$, 2 parts of cadmium silicate, 10 parts of soda and 60 parts of soap, all by weight, are intimately mixed in a suitable grinding mill. A good washing agent is thereby obtained which may be used satisfactorily in the textile industry and in trade laundries as well as in the household. In place of the polyphosphate described in this example, other polyphosphates may be substituted, for example, those polyphosphates having a formula $Na_5P_3O_{10}$ or $Na_6P_4O_{13}$, $Na_{12}P_{10}O_{31}$, or like compounds.

Example 5

An intimate mixture is made of 20 parts of sodium perborate, 33 parts of sodium metaphosphate, 2 parts of barium silicate and 45 parts of soda, all by weight. The resulting composition is a good cleansing and rinsing agent and is particularly suitable for the bleaching of textiles.

Example 6

Ten parts of sodium perborate, 14 parts of sodium pyrophosphate, 1 part of magnesium silicate, 6 parts of soda and 47 parts of soap, all by weight, are thoroughly mixed in any suitable mixing device. An excellent washing agent is obtained which can be used in the household and in industry for washing textiles, for laundering and the like.

Example 7

Fifteen parts of sodium perborate, 10 parts of a sodium polyphosphate, for example, that having the formula $Na_6P_4O_{13}$, 1 part of magnesium silicate, 9 parts of soda and 50 parts of soap, all by weight, are ground together to form a homogeneous mass. By this procedure an excellent washing agent is obtained which is particularly adapted for use in the household for laundering purposes.

By omitting the soap from the composition of this example, an agent is obtained which may be used successfully in rinsing baths employed after the washing operation in the cleansing of textiles.

Example 8

Eight parts of sodium perborate, 12 parts of tetrasodium pyrophosphate, 4 parts of magnesium silicate, 10 parts of soda and 41 parts of soap, all by weight, are mixed thoroughly together in any suitable device. An excellent washing agent is obtained which can be used to advantage in the household and in the laundries for washing textiles of all kinds. The magnesium silicate employed prevents the dissociation of the active oxygen from the dry mixture. During the use of the composition the bleaching action of the oxygen is quite gentle or mild, and does not destroy the fibers.

Example 9

Fifteen parts by weight of sodium perpyrophosphate are intimately mixed with 2 parts by weight of zinc silicate and 60 parts by weight of a soap.

In place of the soap a corresponding quantity of synthetic soap-like compounds may be used, for example a technical mixture of the sodium salts of sulfonated fatty alcohols of high molecular weight.

An excellent washing agent is obtained, which can be used in the household and in industry for washing textiles, for laundering, cleansing and the like.

When the mixture is dissolved in water, the sodium perpyrophosphate decomposes partly with the formation of sodium pyrophosphate; thus the alkaline solution contains sodium perpyrophosphate and sodium pyrophosphate.

Example 10

Ten parts of sodium perborate, 14 parts of sodium pyrophosphate, 9 parts of soda, 1 part of magnesium silicate and 46 parts of a technical mixture of the sodium salt of a sulfonated high-molecular fatty alcohol, such as dodecyl-alcohol, tetradecyl-alcohol, hexadecyl-alcohol, oleic-alcohol, octodecyl-alcohol, all by weight, are intimately mixed in a suitable mixing device. An excellent alkaline washing agent is obtained, which can be used in the household, in the laundries and in industry for washing textiles and the like.

By omitting the soap-like compound a very good rinsing agent is obtained.

Example 11

An intimate mixture is made of 15 parts of sodium perpyrophosphate, 2 parts of magnesium silicate and 60 parts of a soap, all by weight.

In place of the soap a corresponding quantity of synthetic soap preparations may be used, for example a technical mixture of the sodium salt of sulfonated fatty alcohols of high molecular weight.

A good washing agent is obtained, which may be used to advantage in the household and in industry for washing soiled clothes, textiles and the like. When the mixture is dissolved in water, to an alkaline solution the sodium perpyrophosphate decomposes partly with the formation of sodium pyrophosphate, thereby liberating oxygen.

In place of magnesium silicate the same quantity of tin silicate may be added.

Example 12

Eight parts of sodium perborate, 12 parts of tetrasodium pyrophosphate, 10 parts of soda, 4 parts of magnesium silicate and 41 parts of soap, all by weight, are intimately mixed in a suitable mixing device. The composition produced constitutes a washing agent, which is excellently suitable for washing soiled clothes, textiles and the like in the household and in trade laundries. The magnesium silicate employed prevents the dissociation of the active oxygen from the dry mixture. During the use of the composition the bleaching action of the oxygen is quite gentle, and does not destroy the fibres.

Example 13

Ten parts of sodium perborate, 14 parts of sodium pyrophosphate, 1 part of magnesium silicate and 46 parts of a technical mixture of the sodium salt of a sulfonated high-molecular fatty alcohol, such as dodecyl-alcohol, tetradecyl-alcohol, hexadecyl-alcohol, oleic-alcohol, octodecyl-alcohol, all by weight, are intimately mixed in a suitable mixing device. An excellent alkaline washing agent is obtained, which can be used in the household, in the laundries and in industry for washing textiles and the like.

By omitting the soap like compound a very good rinsing agent is obtained.

The ability of the difficultly soluble silicates to stabilize alkaline solutions of mixtures of per compounds and pyrophosphates is somewhat surprising in view of the fact that the stabilizing agents suggested in the prior art do not have any appreciable effect. The addition of water glass which has proven to be excellently satisfactory for the stabilization of per compounds in a mixture with other substances does not work when employed with the mixtures described herein. In certain instances, water glass causes decomposition of the per compound rather than stabilizing it. The stabilization effect of the difficultly soluble silicates is not obtained to an appreciable extent if the silicate is formed in the solution by the reaction of soluble salts and silicates. Therefore the present invention comprehends that the difficultly soluble silicates be formed before they are added to the remaining ingredients for forming the present composition.

In order to illustrate the effectiveness of the difficultly soluble silicates in stabilizing the mixtures herein described, a table of tests is set out below in which the basic mixture employed is composed of 10 parts sodium perborate, 10 parts calcined neutral sodium pyrophosphate, 50 parts soda and 50 parts soap, all by weight. The experiments were made by using 1% solutions of the mixtures and boiling for one-quarter of an hour, after which the amount of perborate decomposed was determined by titration with n/10 permanganate solution.

|   | Product examined | Amount of perborate dissociated |
|---|---|---|
|   |   | Percent |
| I | Mixture without other addition | 90.0 |
| II | Mixture with 1.8 parts by weight of solid, water-soluble water glass. | 92.3 |
| III | Mixture with 1.8 parts by weight of solid, water-soluble water glass and 1 part by weight of common salt. | 88.0 |
| IV | Mixture with 3.4 parts by weight of magnesium sulfate crystals. | 87.6 |
| V | Mixture with 1.8 parts by weight of solid, water-soluble water glass and 3.4 parts by weight of magnesium sulfate crystals. | 82.6 |
| VI | Mixture with 1.5 parts by weight of previously prepared magnesium silicate. | 35.1 |

From this table the extremely beneficial results obtained by the use of magnesium silicate may be readily observed.

Many substances fully equivalent to those disclosed herein but within the broad teachings of the description will occur to those skilled in the art. Therefore, it should be understood that the present invention is not limited to the specific examples of ingredients described nor to any other details given, but that it comprehends a scope commensurate with the broad terms employed in the specification and in the appended claims.

I claim:

1. A bleaching composition composed of 10 parts sodium perborate, 14 parts neutral sodium pyrophosphate, 1 part magnesium silicate and 8 parts soda, all parts by weight.

2. A bleaching composition composed of 15 parts sodium perborate, 10 parts of a sodium polyphosphate, 1 part magnesium silicate, 9 parts soda, 50 parts soap, all parts by weight.

3. A composition of matter for bleaching and cleansing purposes composed of 8 to 21 parts of a per compound capable of liberating oxygen when in aqueous solution, 10 to 37 parts of a water soluble salt of a phosphoric acid having a fewer number of chemically combined water molecules than orthophosphoric acid, a small percentage of a preformed difficultly soluble, colorless silicate of a metal of the group consisting of those in Group II and Group IV of the periodic system and having an atomic weight of from 20 to 140, said silicate being present in a sufficient quantity to reduce dissociation of the per compound by over 50%, over the same composition without said silicate when a 1% aqueous solution of the compositions is boiled for one quarter hour, and a water soluble alkaline detergent in a sufficient quantity to render aqueous solutions of the composition alkaline in character.

4. A composition of matter for bleaching and cleansing purposes composed of 8 to 21 parts of a per compound capable of liberating oxygen when in aqueous solution, 10 to 37 parts of a water soluble salt of a phosphoric acid having a fewer number of chemically combined water molecules than orthophosphoric acid, 6 to 45 parts of a water soluble alkaline detergent, and 1 to 4 parts of a preformed difficultly soluble, colorless silicate of a metal of the group consisting of those in Group II and Group IV of the periodic system and having an atomic weight of from 20 to 140, said silicate being present in a sufficient quantity to stabilize the per compound all parts by weight.

5. A composition of matter for bleaching and cleaning purposes composed of at least about 10% of a per compound capable of liberating oxygen when in aqueous solution, at least about 10% of a water soluble salt of a phosphoric acid having a fewer number of chemically combined water molecules than orthophosphoric acid, not more than about 50% of a water soluble alkaline detergent and at least about 0.5% to 5% of a preformed difficultly soluble, colorless silicate of a metal of the group consisting of those in Group II and Group IV of the periodic system and having an atomic weight from 20 to 140, said silicate being present in a sufficient quantity to stabilize the per compound used, said percentages being based on the composition of only the specified ingredients.

6. The composition of claim 3 to which a saponaceous compound has been added.

7. A bleaching and cleaning composition containing approximately 8 to 21 parts of sodium perborate approximately 10 to 37 parts of sodium pyrophosphate approximately 6 to 45 parts of a water soluble alkaline detergent and approximately 1 to 4 parts of a preformed difficultly soluble colorless silicate of a metal of the group consisting of Group II and IV of the periodic system and having an atomic weight of from 20 to 140, all parts by weight.

8. A bleaching and cleaning composition consisting of approximately 15 parts of sodium perpyrophosphate to approximately 2 parts of a stabilizer consisting of a preformed difficultly soluble colorless silicate of a metal of the group consisting of Group II and IV of the periodic system and having an atomic weight of from 20 to 140 and approximately 60 parts of a saponaceous compound.

9. A composition of matter for bleaching and cleansing purposes consisting of a per compound capable of liberating oxygen when in aqueous solution and a water soluble salt of a phosphoric acid having a fewer number of chemically combined water molecules than orthophosphoric acid in sufficient amounts to act as a detergent and to increase the decomposition of the per compound in an alkaline medium where no separate stabilizer is used, a water soluble alkaline detergent and a preformed difficultly soluble colorless silicate of a metal of the group consisting of those in Group II and IV of the periodic system and having an atomic weight of from 20 to 140, said per compound being present in the ratio of 8 to 21 parts by weight of per compound to 10 to 37 parts by weight of the salt of the phosphoric acid, said alkaline detergent being present in amounts sufficient to render aqueous solutions of the composition alkaline in character and said silicate being present in sufficient quantity to reduce dissociation of the per compound by over 50% as compared with the same composition without said silicate when 1% aqueous solutions of the compositions are boiled for one quarter hour, said ratios being based on the proportions only of the specified ingredients.

OTTO LIND.